(No Model.)

E. A. STILES.
DEVICE FOR SUSPENDING ANIMALS.

No. 379,251. Patented Mar. 13, 1888.

ATTEST-
Harry L. Amer
I. J. Masson

INVENTOR-
Elmer A. Stiles.
by E. E. Masson
atty.

UNITED STATES PATENT OFFICE.

ELMER A. STILES, OF ST. CLOUD, MINNESOTA.

DEVICE FOR SUSPENDING ANIMALS.

SPECIFICATION forming part of Letters Patent No. 379,251, dated March 13, 1888.

Application filed October 18, 1887. Serial No. 252,729. (No model.)

*To all whom it may concern:*

Be it known that I, ELMER A. STILES, a citizen of the United States of America, residing at St. Cloud, in the county of Stearns and State of Minnesota, have invented certain new and useful Improvements in Devices for Suspending Animals, of which the following is a specification, reference being had therein to the accompanying drawings.

My invention relates to improvements in hooks or animal-suspending devices; and the objects of my improvements are to prevent sudden and violent strains on the ball-joint of the leg or of other parts of suspended animals, that often cause the meat of these parts to become torn and damaged. I attain these objects by the construction illustrated in the accompanying drawings, in which—

Figure 1:
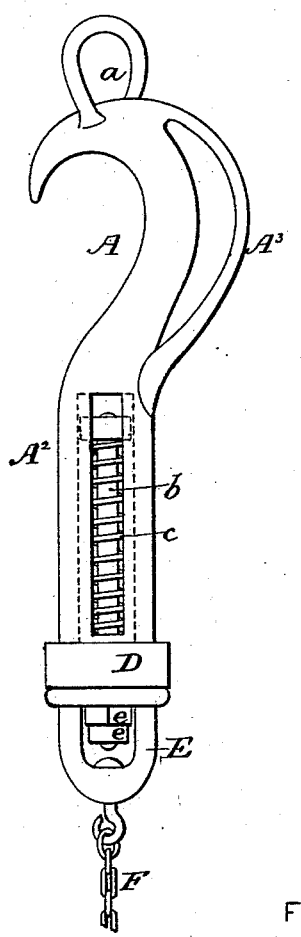
Figure 2:
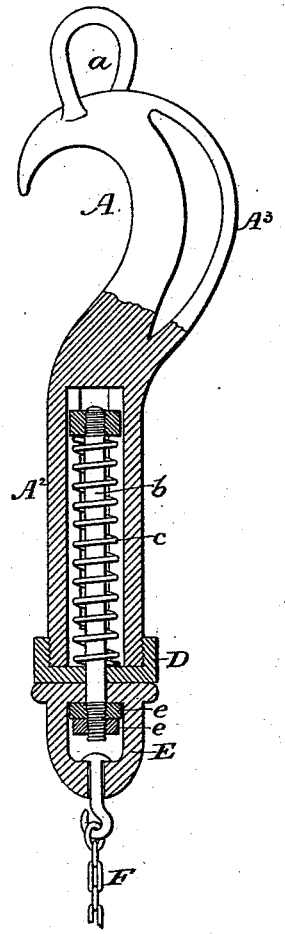
Figure 3:

Figure 1 is a side view of a suspension-hook constructed in accordance with my invention. Fig. 2 is a vertical section of the same. Fig. 3 represents the same hook, on a small scale, with an animal suspended therefrom.

In said drawings, A represents a hook having a hollow or longitudinally-slotted shank, $A^2$, to receive a rod or stem, $b$, and a spring, $c$, coiled around said stem. The hook is provided with a handle, $A^3$, on one side thereof, by which it can be carried and suspended or removed. To the upper end of the hook a link, $a$, is welded, by which the device can also be suspended. Upon the lower end of the shank $A^2$ is placed a nut, D, that closes said shank; but said nut is centrally perforated for the passage of the stem $b$, and to the lower end of said stem is secured the circular hollow swivel E by means of the nuts $e$, placed upon said stem in the cavity of said swivel, and from the lower end of the swivel is suspended a chain, F, that can be wrapped around the leg of an animal and secured thereto by a hook or any other suitable fastening. As the spring $c$ is retained in the cavity of the hook between the head $b^2$ of the stem $b$ and the nut D on the lower end of said hook, any heavy weight or body suddenly suspended from the swivel or from the lower end of the stem $b$ will cause it to "teeter" on the spring and prevent damage to said body.

Having now fully described my invention, I claim—

The combination of a hook having a handle on one side and a hollow shank, a centrally-perforated nut closing said shank, a coiled spring within said shank, and a stem having its head resting upon said spring, and nuts on its lower end, with a swivel resting upon said nuts, substantially as and for the purpose described.

In testimony whereof I affix my signature in presence of two witnesses.

ELMER A. STILES.

Witnesses:
ANDREW C. ROBERTSON,
FRANK I. STILES.